Oct. 3, 1933.

H. NYQUIST 1,928,735

MULTICONDUCTOR SYSTEM FOR SIGNALING CIRCUITS

Filed March 19, 1932

INVENTOR
*H. Nyquist*
BY
ATTORNEY

Patented Oct. 3, 1933

1,928,735

UNITED STATES PATENT OFFICE 1,928,735

MULTICONDUCTOR SYSTEM FOR SIGNALING CIRCUITS

Harry Nyquist, Millburn, N. J., assignor to American Telephone and Telegraph Company, a corporation of New York Application March 19, 1932. Serial No. 599,998

6 Claims. (Cl. 179—78)

A principal object of my invention is to provide a new and improved system for neutralizing crosstalk in multi-conductor cables. In this connection it is a further object to provide a mutual inductance cross connection from a conductor of one pair to a conductor of another pair, and in combination therewith to provide means to neutralize the self-inductance in a single pair incidental to such a cross connection. Still another object of my invention is to effect such neutralization of self-inductance by means of capacities properly connected. All these objects and various other objects and advantages of my invention will become apparent on consideration of a specific example of practice according to the invention. It will be understood that the following description relates principally to this particular example of the invention and that its scope will be indicated in the appended claims.

Figure 1:
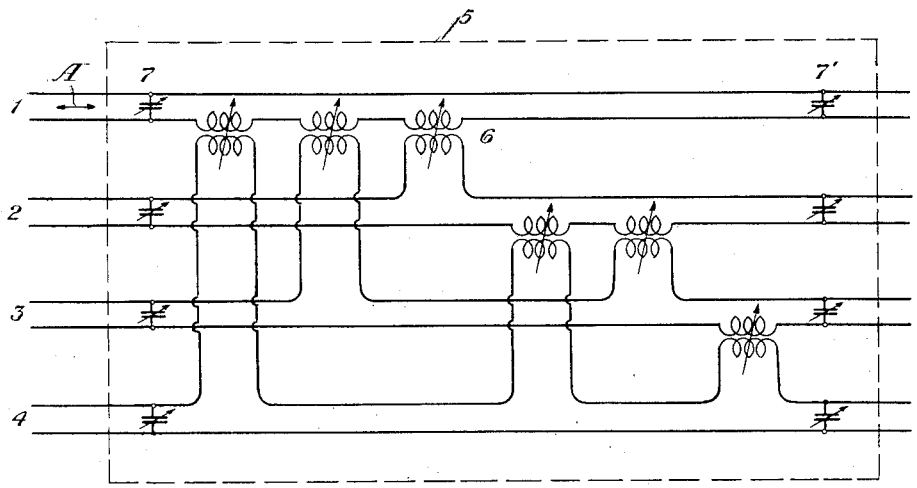
Figure 2:
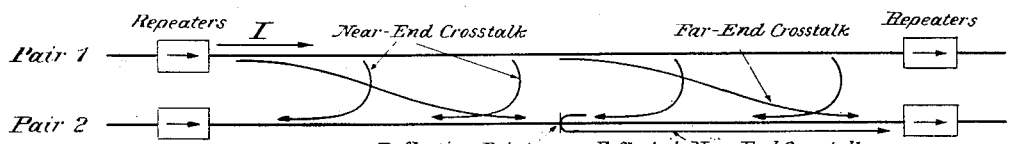
Figure 3:
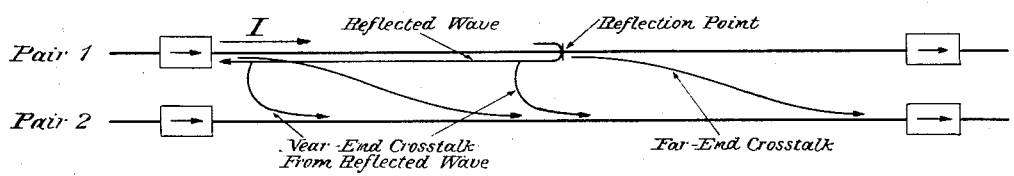
Figure 4:
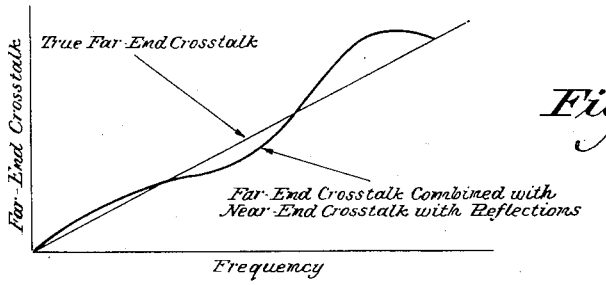

In the accompanying drawing; Figure 1 is a diagramatic representation of several conductor pairs and a crosstalk balancing panel therefor; Figs. 2 and 3 are diagrams to illustrate a typical group of crosstalk paths; these diagrams will be used in explaining the effect of reflections in the circuit upon the crosstalk; and Fig. 4 is a curve diagram that will be used in this connection.

In Fig. 1 four conductor pairs 1, 2, 3 and 4 are represented as passing across the panel board 5. In this diagrammatic representation it is assumed that there are crosstalk effects between each pair and each of the other pairs, and that these effects are neutralized by mutual inductance connections between one side of each pair and a side of each other pair. These mutual inductance connections are all represented as adjustable, one such connection being indicated, for example, at 6 between one side of pair 1 and one side of pair 2.

The mutual inductance linkage between the two coils as at 6 will involve a considerable amount of self-inductance in each conductor corresponding to a coil. That is, due to the mutual inductance 6 there will be a certain amount of self-inductance in each of the circuits 1 and 2. Even if the coils at 6 were wound with the utmost care to reduce self-inductance there would necessarily be some self-inductance if there is to be mutual inductance between the two windings. In practice, the adjustment of the mutual inductance may be by moving the coils to or from each other and in that case there may be a very considerable amount of self-inductance in each circuit.

Whatever the self-inductance in circuits 1 and 2 due to the mutual inductance 6 may be, there will be additional self-inductance in each circuit due to the mutual inductance connections with other circuits such as 3 and 4. The drawing is diagrammatic and in practice there may be one hundred circuits more or less, and any one of these circuits may have mutual inductance connections with a large number of the other circuits so that the total self-inductance in each circuit may become of considerable magnitude.

This self-inductance in each circuit constitutes a lumped impedance irregularity that tends to reflect currents in each circuit. More particularly, the effects of such reflections are illustrated schematically in Figs. 2 and 3 for two pairs, pair 1 which is the energized pair and pair 2 which is the disturbed pair. In Fig. 2 the near-end crosstalk wave which flows back toward the reflection point in pair 2 is here reflected and combines with the direct or true far-end crosstalk in that pair. Further, in Fig. 3, a part of the main transmission wave is shown reflected back at the reflection point in pair 1. This reflected wave gives near-end crosstalk which further adds to the reflected near-end crosstalk and the far-end crosstalk in pair 2. Now the relative phases between these three crosstalk waves in pair 2 will vary with the frequency at which pair 1 is energized. A plot illustrating a possible variation of far-end crosstalk with this frequency is shown in Fig. 4. The direct or true far-end crosstalk is substantially directly proportional to the frequency. When the near-end crosstalk combined with the reflections is added to the true far-end crosstalk, at some frequencies in phase addition, at others in phase opposition, the resultant far-end crosstalk frequency characteristic becomes a sinuous or irregular curve.

Now, it is possible to neutralize far-end crosstalk by mutual inductance connections such as shown in Fig. 1 or by other simple means when the crosstalk varies in direct proportion to the frequency in the way shown by the curve marked "True far-end crosstalk" in Fig. 4. However, such neutralization becomes much more difficult or impossible when the crosstalk varies in a more or less irregular manner such, for example, as illustrated by the curve showing the resultant crosstalk. Thus the existence of such reflection points in the circuits causes a definite hardship in effecting a neutralization of the crosstalk.

To remedy this condition, condensers of proper capacity values are connected across the conductor pairs as represented in Fig. 1 at 7 and 7' for pair 1. These condensers are represented in the drawing as adjustable, and the two condensers for one pair are placed respectively before and after all the inductance coil windings and are given equal values of capacity such that the total capacity C satisfies the equation $$\sqrt{L/C}=K,$$

where L is the total self-inductance in the corresponding circuit due to the mutual inductance connections between that circuit and other circuits, and K is the nominal characteristic impedance of the conductor pair (that is $$K=\sqrt{L'/C'},$$

where L' is the self-inductance of the pair per unit length of circuit, and C' is the mutual capacitance of the pair per unit length). At high frequencies K will be very nearly equal to the resistance component of the actual impedance.

With the capacities introduced as shown, and with the values stated, the impedance will become the same looking both ways as at such a point as A, and the objectionable reflection effects that have been mentioned will be obviated.

I claim:

1. In combination, a plurality of neighboring conductor pairs for signaling, each pair being exposed to cross-talk from other pairs, a mutual inductance connection between a conductor of one pair and a conductor of another pair, said inductance being adjusted to neutralize the crosstalk, and a condenser between the conductors of one such pair to compensate the self inductance of such mutual inductance connections.

2. In combination, a plurality of neighboring conductor pairs for signaling, mutual inductance connections between some of the conductors of different pairs, and condensers connected between the conductors of the respective pairs, these condensers being given the proper capacity values to neutralize the lumped impedance to make the overall characteristic impedance the same both ways along the conductor pairs.

3. In combination, a plurality of neighboring conductor pairs for signaling, a plurality of mutual inductances each connected between a conductor of one pair and a conductor of another pair to reduce crosstalk between such pairs, and condensers, there being two of these condensers respective to each pair involved in the aforesaid mutual inductance connections, each of such two condensers being of the same capacity value and at a respective side of all the mutual inductance connections involving the respective pair, the total capacity C of such two condensers satisfying the equation $$\sqrt{L/C}=K,$$

where L is the total self-inductance of the corresponding pair due to said mutual inductance connections, and K is the nominal characteristic impedance of that pair.

4. The method of neutralizing crosstalk between neighboring conductor pairs which consists in establishing mutual inductance effects between them and obviating the reflection due to the lumped impedance nature of the incidental self-inductance in each pair by making cross-capacity connections between the sides of each pair.

5. In combination, a plurality of neighboring conductor pairs with a normal tendency to crosstalk between each such pair and each of the other pairs, adjustable mutual inductances between the same pairs whereby a certain inevitable amount of self induction is introduced in each such pair, each said mutual inductance being adjusted to annul the tendency to crosstalk, and adjustable condensers across each said pair, said condensers being adjusted in relation to said self inductances to give a smooth characteristic impedance along each pair and obviate reflection effects.

6. The method of neutralizing crosstalk between neighboring conductor pairs without introducing reflection effects which consists in establishing mutual inductance effects between said pairs directly to neutralize the crosstalk, and introducing capacity effects across each pair to neutralize the self inductance in such pair incidental to the mutual inductance between such pair and other pairs.

HARRY NYQUIST.